(12) United States Patent
Helmick et al.

(10) Patent No.: US 10,751,859 B2
(45) Date of Patent: Aug. 25, 2020

(54) FASTENER-INSTALLATION SYSTEMS AND METHODS

(71) Applicant: The Boeing Company, Chicago, IL (US)

(72) Inventors: Eerik J. Helmick, Seattle, WA (US); Edward L. White, Covington, WA (US); Jennifer Elizabeth Anderson, Louisville, CO (US); Claire Noel Diehl, Somerville, MA (US); Joseph Nicholas Kochevar, Kent, WA (US); Maura Elizabeth Cosman, Sharon, MA (US); Sophia Victoria Utset-Ward, Falcon Heights, MN (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 15/418,967

(22) Filed: Jan. 30, 2017

(65) Prior Publication Data
US 2018/0215018 A1   Aug. 2, 2018

(51) Int. Cl.
*B25B 23/04* (2006.01)
*B25B 21/00* (2006.01)
(Continued)

(52) U.S. Cl.
CPC ............ *B25B 21/002* (2013.01); *B25B 23/04* (2013.01); *B25B 23/106* (2013.01); *B25C 1/188* (2013.01); *B64F 5/10* (2017.01)

(58) Field of Classification Search
CPC ....... B25B 21/002; B25B 23/04; B25B 23/06; B25C 1/188; B64F 5/10; F16B 27/00
See application file for complete search history.

(56) References Cited

U.S. PATENT DOCUMENTS

| | | | | |
|---|---|---|---|---|
| 3,398,446 A | * | 8/1968 | Karlsson | B29D 30/66 29/815 |
| 3,854,648 A | * | 12/1974 | Inzoli | B25C 1/003 227/136 |

(Continued)

OTHER PUBLICATIONS

Hipsher, Carol et. al., "Fire Protection: Cargo Compartments," AERO Quarterly, Issue 42, Quarter 02, 2011, pp. 11-19 (www.boeing.com/commercial/aeromagazine).

(Continued)

*Primary Examiner* — Sarang Afzali
*Assistant Examiner* — Ruth G Hidalgo-Hernanedez
(74) *Attorney, Agent, or Firm* — McDonnell Boehnen Hulbert & Berghoff LLP

(57) ABSTRACT

A fastener-installation system is described that includes a driver to drive a fastener into a structure and a fastener feeder to load the fastener into a loaded position of the driver. The fastener feeder includes a fastener magazine to hold a plurality of fasteners. The fastener-installation system further includes a driver head having a plurality of jaws moveable between a closed position and an expanded position. In the closed position, the plurality of jaws form a piercing tip to pierce material of the structure. Further, the jaws spread apart the material of the structure when the jaws move from the closed position to the expanded position to create a path through the material through which the fastener is driven.

20 Claims, 14 Drawing Sheets

(51) Int. Cl.
  *B25C 1/18*    (2006.01)
  *B64F 5/10*    (2017.01)
  *B25B 23/10*   (2006.01)

(56)  References Cited

U.S. PATENT DOCUMENTS

| | | | | |
|---|---|---|---|---|
| 4,476,749 | A * | 10/1984 | McKean | B25B 21/002 |
| | | | | 81/53.2 |
| 5,027,679 | A * | 7/1991 | Kawashima | B25B 23/045 |
| | | | | 81/433 |
| 7,455,207 | B2 * | 11/2008 | Wojcicki | B25C 1/003 |
| | | | | 227/120 |
| 2005/0092806 | A1 * | 5/2005 | Miller | B25C 1/005 |
| | | | | 227/8 |
| 2005/0150148 | A1 | 7/2005 | Herpel | |
| 2008/0276761 | A1 * | 11/2008 | Hale | B25B 23/045 |
| | | | | 81/57.37 |

OTHER PUBLICATIONS

Duraspin Technology, Senco Brands, Inc., "Auto-Feed Screwdriver Operating Instructions," Issued Jan. 16, 2013 (22 pages).
Bosch, "Operating/Safety Instructions," dated Feb. 18, 2012 (32 pages).
Bosch Power Tools, 4,500 RPM Drywall Screwgun with Auto-Feed (https://www.boschtools.com/us/en/boschtools-ocs/screwguns-sg450af-36154-p/), 5 pages, printed from World Wide Web on Jan. 13, 2017.
Nerf N-Strike MEGA Mastodon Blaster, Nerf, Back to Nerf Products (http://nerf.hasbro.com/en-uslproduct/nerf-n-strike-mega-mastcdon-blaster:DE85E653-5056-9047-F5EC-AB7A81C1F125), 5 pages, printed from World Wide Web on Jan. 18, 2017.

* cited by examiner

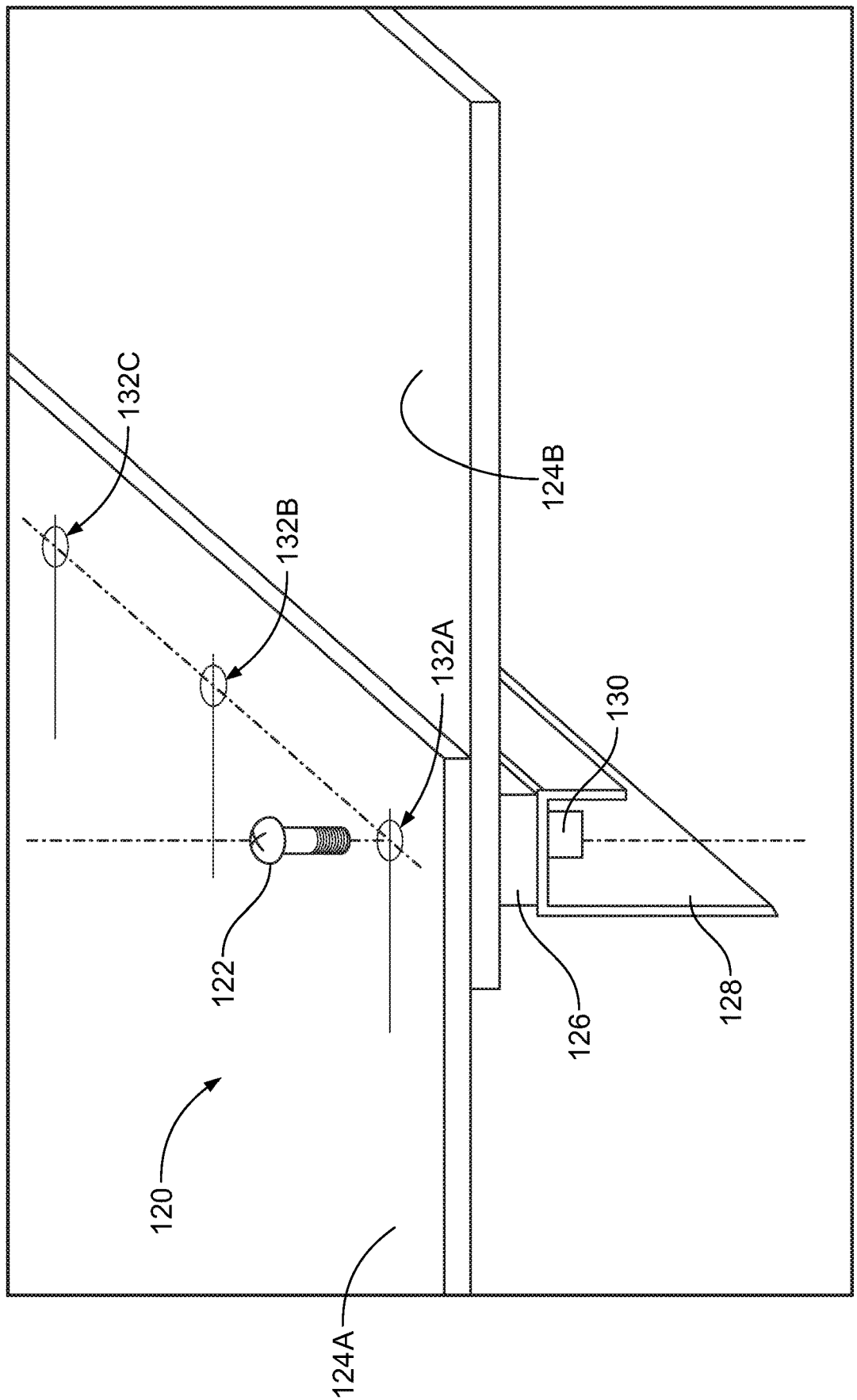

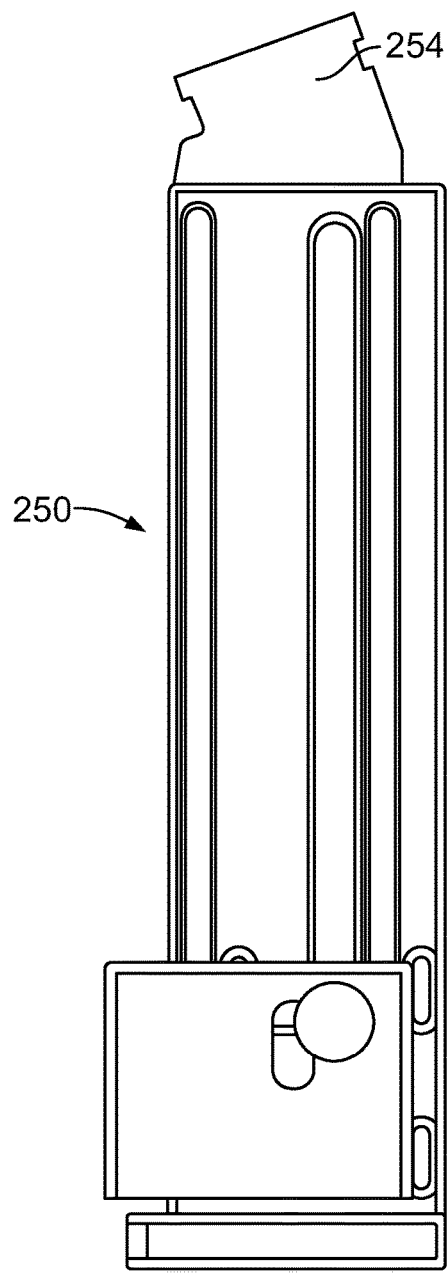 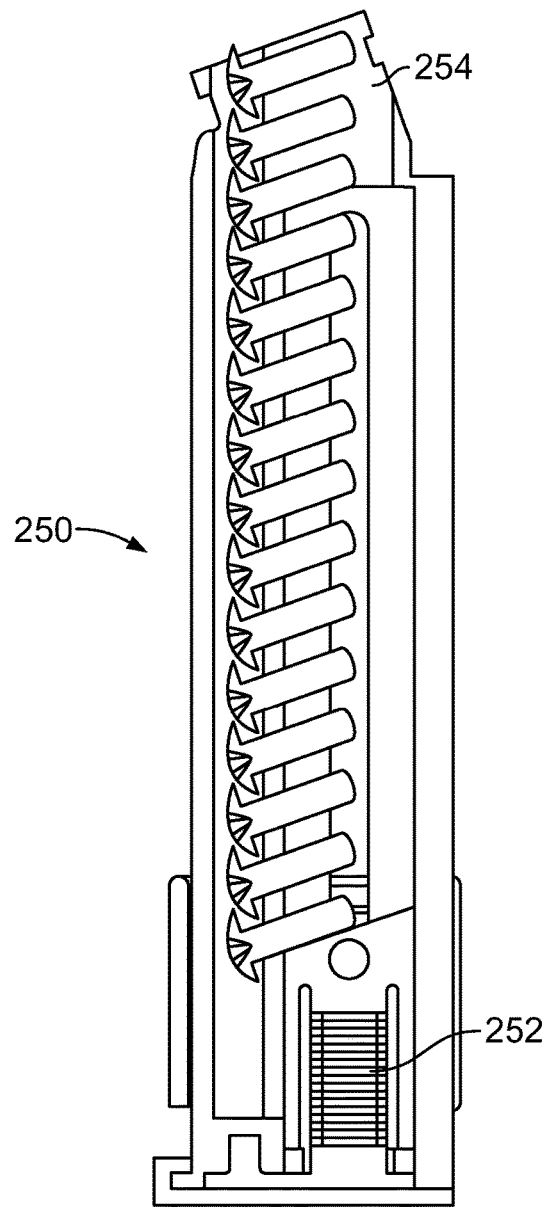
FIG. 12A  FIG. 12B

FASTENER-INSTALLATION SYSTEMS AND METHODS

FIELD

The present disclosure generally relates to installing fasteners into a structure, and more particularly to, methods and systems to spread apart material of the structure as the fastener is installed into the structure.

BACKGROUND

Cargo compartments of an aircraft typically include cargo-liner panels secured to an airplane structure, such as a bracket attached to the airframe of the aircraft. The typical cargo-liner panel installation process involves installing fasteners (e.g., screws) to secure the cargo-liner panels to the airplane structure. Prior to installing the fasteners to secure the cargo-liner panels to the airplane structure, foam tape or other compliant material is placed between the cargo-liner panels and the airplane structure. The foam tape or other compliant material helps to provide fire protection such preventing fire and smoke migration to other areas of the aircraft.

Current methods of installing fasteners to secure cargo-liner panels to the airplane structure involve the installer marking on the foam tape locations through which the fastener is to be installed. The installer then punches out holes in the foam tape to create a path through which the fastener is to be installed. The installer then aligns the cargo-liner panels with the punched-out holes in the foam tape. The installer then hand inserts a fastener into each hole and uses a screw gun to drive each fastener through the panel, foam tape, and airplane structure to secure the panel to the airplane structure.

The current methods of installing fasteners, however, have numerous drawbacks. An example drawback is that the current methods are time consuming and require installers to spend a substantial amount of time in the cargo compartment installing the cargo-liner panels. However, working in the cargo compartment often places various ergonomic stresses on the installer. For instance, the installers often operate in tight spaces which may require reaching, kneeling, and orienting their body in various positions and angles to properly install the fasteners to secure the cargo-liner panels to the airplane structure. Another example drawback is that the current methods require the installer to use different tools to (i) punch out holes in the foam tape and (ii) drive the fastener into the structure to secure the cargo-liner panels to the airplane structure. The installer may often have to switch back and forth between these different tools, which not only extends the installation time but also results in additional reaches for the installer and other ergonomic stresses.

Another example drawback is that the current methods also require the installer to manually place fasteners to be driven into the structure. Manually placing the fasteners not only extends the installation time but also results in additional reaches and other ergonomic stresses. Although systems for automatically feeding fasteners into drivers exist, these existing systems typically involve using fasteners bound together with plastic or some other sacrificial material. Such existing systems, however, are not suitable for cargo-liner panel installation, as the plastic or sacrificial material often create a mess in the cargo compartment which may lead to foreign object debris (FOD) in the cargo compartment.

What is needed is a system for installing fasteners that simplifies the cargo-liner panel installation process, reduces ergonomic stresses associated with the cargo-liner panel installation process, and reduces the overall time required for the cargo-liner panel installation process. Further, a system that automatically loads fasteners into a driver and reduces or prevents FOD during the cargo-liner panel installation process is also needed.

SUMMARY

In one example, a fastener-installation system is described that includes a driver to drive a fastener into a structure and a fastener feeder to load the fastener into a loaded position of the driver. The fastener feeder includes a fastener magazine to hold a plurality of fasteners. The fastener-installation system also includes a driver head having a plurality of jaws moveable between a closed position and an expanded position. In the closed position, the plurality of jaws form a piercing tip to pierce material of the structure. Further, the jaws spread apart the material of the structure when the jaws move from the closed position to the expanded position to create a path through the material through which the fastener is driven.

In another example, an attachment for a driver is described that includes a main body having a connector to attach to a corresponding connector of the driver. The attachment also includes a fastener feeder to load a fastener into a loaded position for being driven by the driver, and the fastener feeder includes a fastener magazine to hold a plurality of fasteners. The attachment further includes a driver head located at a distal end of the main body. The driver head includes a plurality of jaws moveable between a closed position and an expanded position. In the closed position, the plurality of jaws form a piercing tip to pierce material of a structure. The jaws spread apart material of the structure when the jaws move from the closed position to the expanded position to create a path through the material through which the fastener is driven.

In yet another example, a method of driving a fastener into a structure is described. The structure includes at least one layer having a preformed hole and at least one layer without a preformed hole. The method includes a fastener-installation system simultaneously (i) spreading apart material of the at least one layer without the preformed hole to create a path through the material and (ii) driving a fastener into the structure. Spreading apart the material includes a plurality of jaws of the fastener-installation system expanding to spread apart the material. The method further includes the fastener-installation system loading a second fastener into a loaded position of the fastener-installation system after the fastener-installation system drives the fastener into the structure.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

FIG. 4 illustrates an example structure into which the example fastener-installation system of FIG. 1A may drive a fastener, according to an example embodiment.

FIGS. 12A-B illustrate a side view and a perspective, cross-sectional view of an example fastener magazine of the example fastener-installation system of FIG. 1A, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As mentioned above, current systems and methods for installing fasteners to secure cargo-liner panels to an airplane structure have a number of drawbacks. For instance, existing methods of installing fasteners to secure cargo-liner panels to an airplane structure result in various ergonomic stresses and also require installers to spend a substantial amount of time in the cargo compartment. The methods and systems in accordance with the present disclosure beneficially provide improved methods and systems for installing fasteners to secure cargo-liner panels to an airplane structure.

Figure 1A:
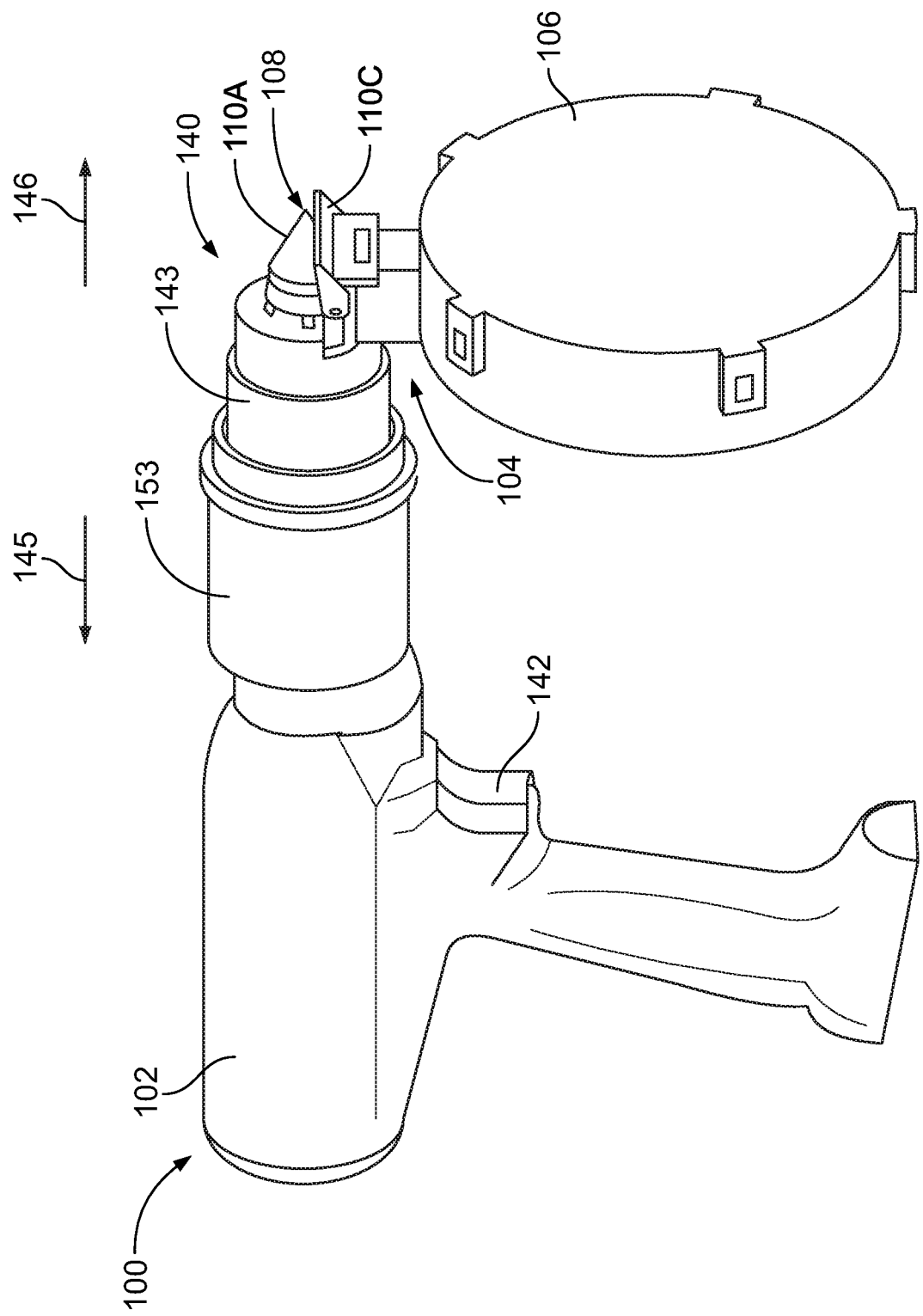
FIG. 1A illustrates a perspective view of an example fastener-installation system, according to an example embodiment.
Figure 1B:
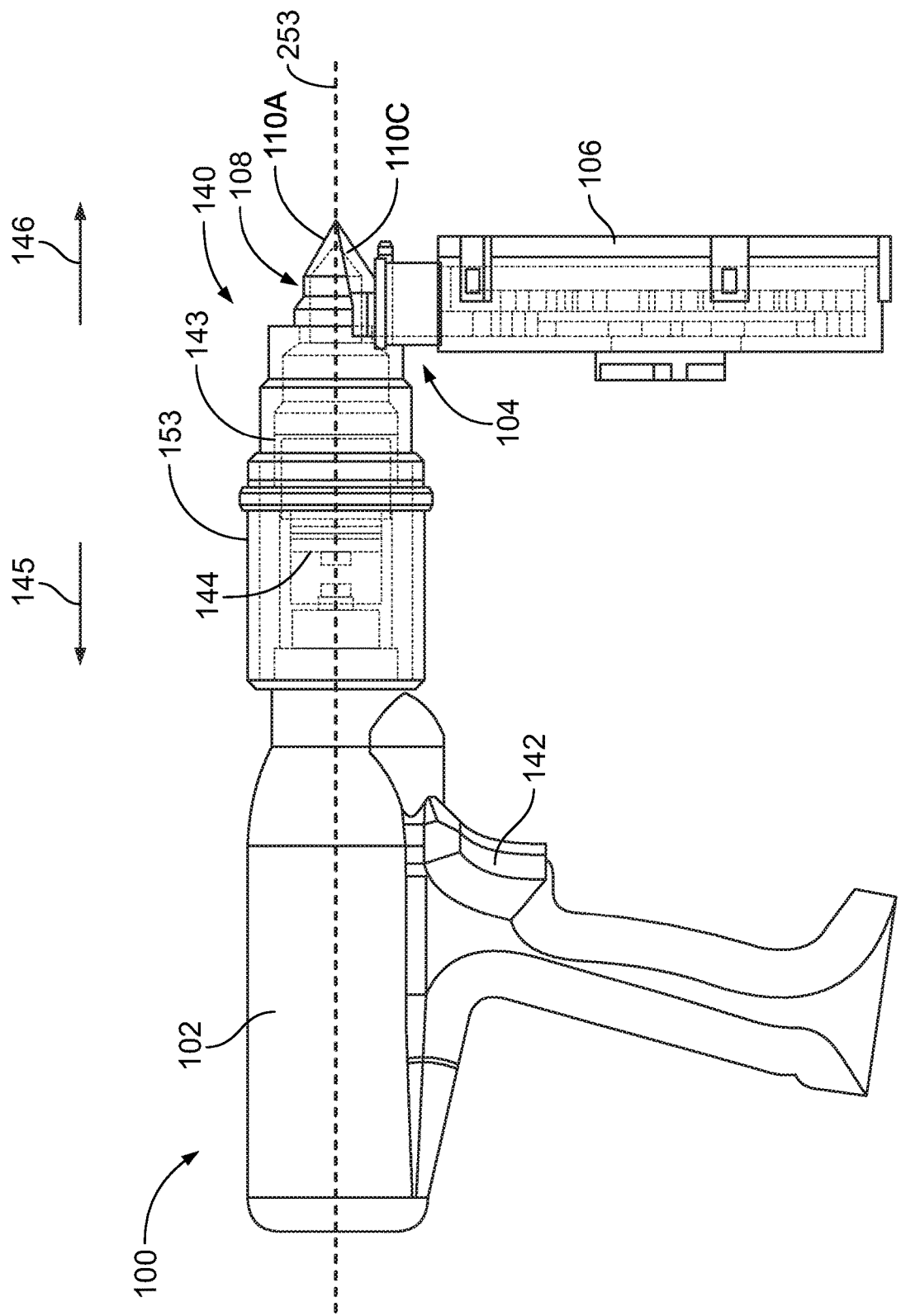
FIG. 1B illustrates a side view of the example fastener-installation system of FIG. 1A showing various internal components, according to an example embodiment.

In one example, a fastener-installation system is described that includes a driver to drive a fastener into a structure and a fastener feeder to load the fastener into a loaded position of the driver. The fastener feeder includes a fastener magazine to hold a plurality of fasteners. The fastener-installation system also includes a driver head having a plurality of jaws moveable between a closed position and an expanded position. In the closed position, the plurality of jaws form a piercing tip to pierce material of the structure. Further, the jaws spread apart the material of the structure when the jaws move from the closed position to the expanded position to create a path through the material through which the fastener is driven. The fastener-installation system beneficially simplifies the cargo-liner panel installation process, reduces ergonomic stresses associated with the cargo-liner panel installation process, and reduces the overall time required for the cargo-liner panel installation process Referring now to FIGS. 1A-B, a fastener-installation system 100 is illustrated. The system 100 includes a driver 102 to drive a fastener into a structure and a fastener feeder 104 to load the fastener into a loaded position of the driver. The fastener feeder 104 includes a fastener magazine 106 to hold a plurality of fasteners. The system 100 further includes a driver head 108 including a plurality of jaws 110A-C moveable between a closed position and an expanded position.

Figure 2A:
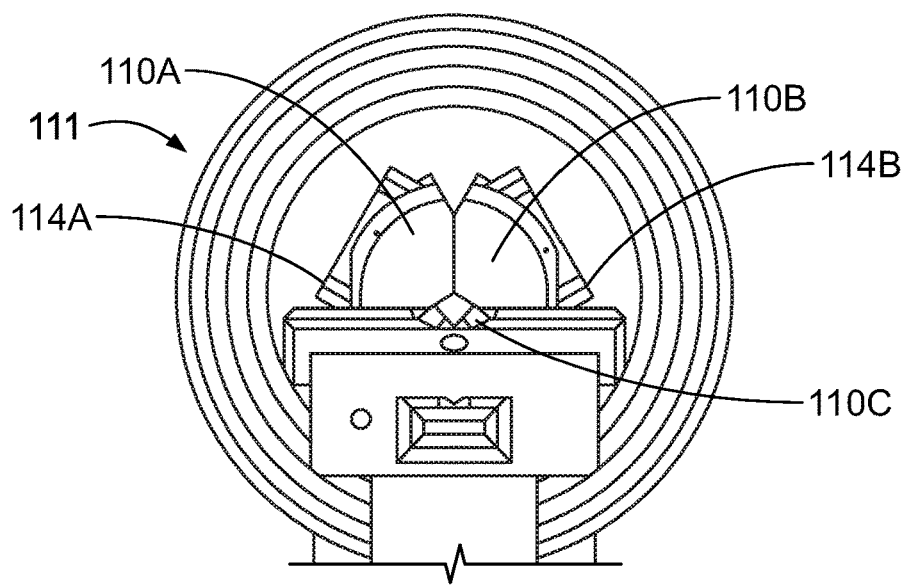
FIGS. 2A-C illustrate a front view, a side view, and a top view of an example driver head of the example fastener-installation system of FIG. 1A in a closed position, according to an example embodiment.
Figure 2B:
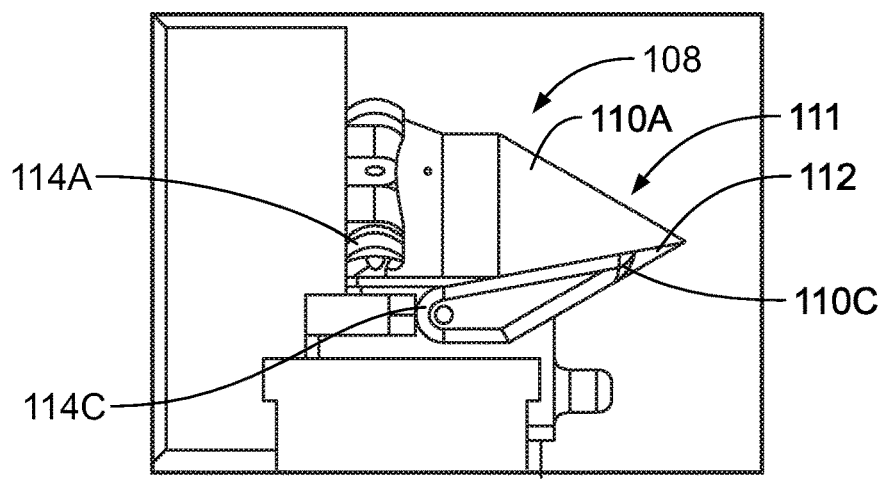
Figure 2C:
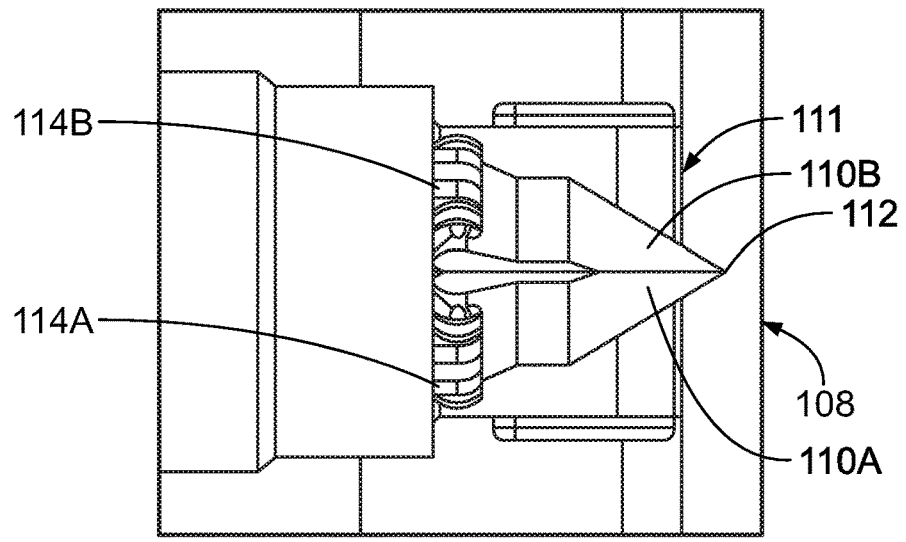
Figure 3A:
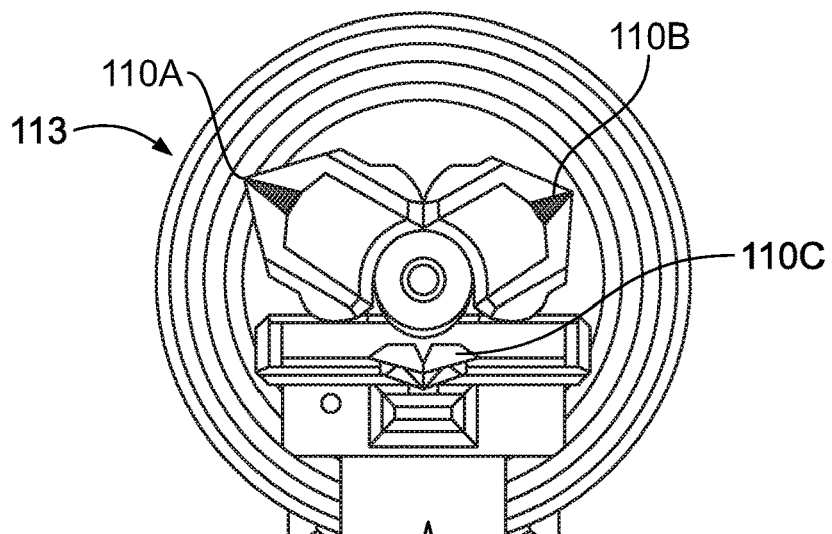
FIGS. 3A-C illustrate a front view, a side view, and a top view of an example driver head of the example fastener-installation system of FIG. 1A in an expanded position, according to an example embodiment.
Figure 3B:
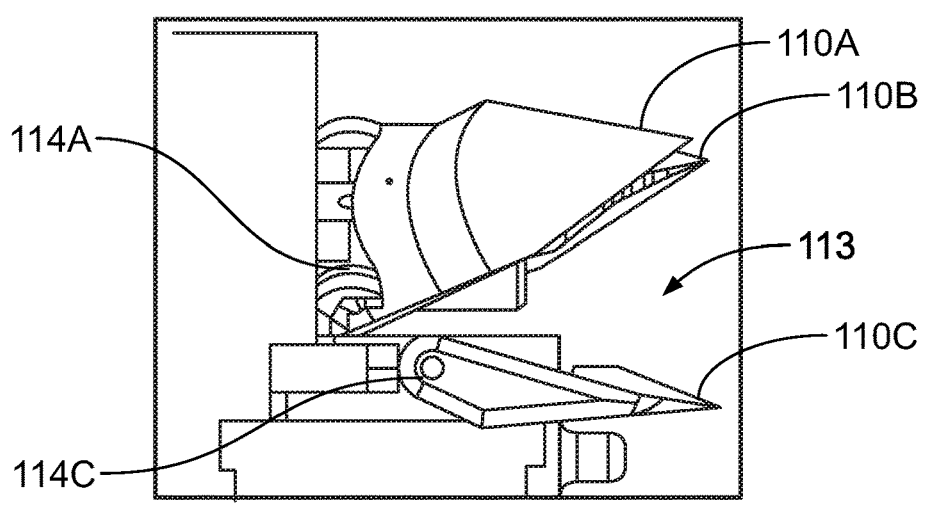
Figure 3C:
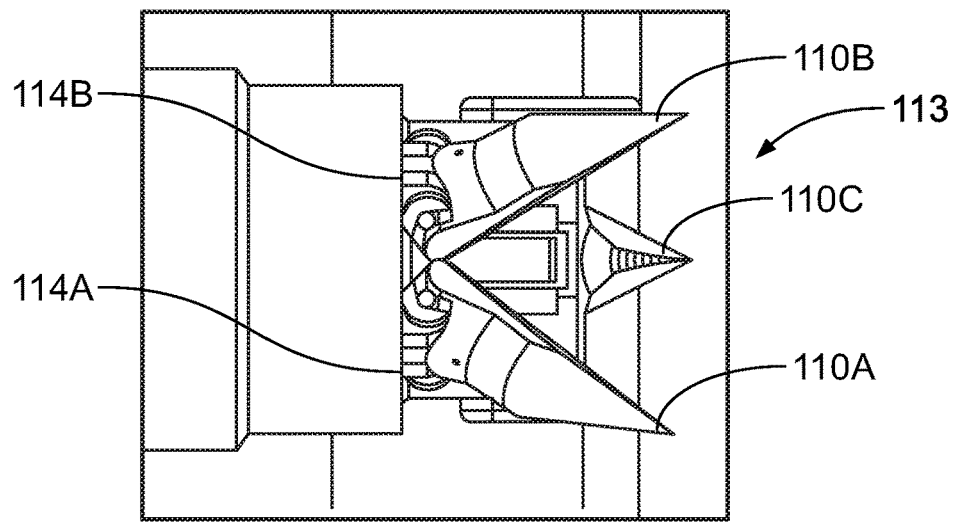

FIGS. 2A-C illustrate the plurality of jaws 110A-C in a closed position 111. In the closed position 111, the plurality of jaws 110A-C form a piercing tip 112 to pierce material of the structure into which the fastener is inserted. Further, FIGS. 3A-C illustrate the plurality of jaws 110A-C in an expanded position 113. The jaws 110A-C act to spread apart the material of the structure when the jaws 110A-C move from the closed position 111 to the expanded position 113 to create a path through the material through which the fastener is driven. This spreading ensures that the material does not get caught in the hole when the fastener is driven into the structure. Further, the piercing tip 112 and spreading of the jaws 110A-C help to prevent the material from binding with the fastener (e.g., with threads of the fastener) when the fastener is driven into the structure. In an example embodiment, each jaw 110A-C is spring loaded. For instance, as shown in FIGS. 2A-C and 3A-C, each jaw includes a spring-loaded hinge 114A-C. The spring-loaded hinges 114A-C act to bias the jaws 110A-C into the closed position.

Jaws 110A-C may be made from any suitable material. In an example, the jaws 110A-C comprise metal, so as to allow the jaws to be suitable to spread apart a wide variety of material types. Metal may help the jaws 110A-C withstand a large amount of pressure as the jaws spread apart the material of the structure. However, in other examples, other materials are of course possible as well.

Although FIGS. 1A-3C depict three jaws, more or fewer jaws are possible. For instance, in an example, the driver head 108 includes four or more jaws. In another example, the driver head 108 includes two jaws. Other examples are possible as well.

In an example embodiment, the fastener-installation system 100 is used for driving a fastener into a structure in order to secure different layers of the structure to one another. In a particular example, the fastener-installation system 100 may be used for securing cargo-liner panels to an airplane structure. An example cargo-liner panel installation process is described with reference to FIG. 4. In particular, FIG. 4 illustrates an example structure 120 into which the faster-installation system 100 may install a fastener, such as fastener 122. Example structure 120 includes multiple layers, including at least one panel such as panels 124A-B, foam 126, airplane structure 128, and nut 130. In an example embodiment, the panels 124A-B are fiberglass panels, foam 126 is foam tape or another compliant material to help prevent fire and smoke migration to other areas of the aircraft, and the airplane structure 128 is a bracket coupled to the airframe. Fastener 122 may be inserted into structure 120 in order to secure panels 124A-B to the airplane structure 128. In another example, the structure 120 includes one panel rather than both panels 124A-B.

In an example embodiment, the structure 120 includes at least one layer having a preformed hole and at least one layer without a preformed hole, and fastener-installation system 100 acts to simultaneously (i) spread apart material of the at least one layer without the preformed hole to create a path through the material and (ii) drive a fastener into the structure. For instance, as seen in FIG. 4, panel 124a includes preformed holes 132A-C. Similarly, panel 124B, airplane structure 128, and nut 130 also include corresponding preformed holes. On the other hand, foam 126 is a layer than does not include a preformed hole. When fastener-installation system 100 is used to drive fastener 122 into structure 120, fastener-installation system 100 acts to simultaneously (i) spread apart foam 126 to create a path through the foam 126 and (ii) drive a fastener into the structure 120 to secure the panels 124A-B to the airplane structure 128.

In an example embodiment, fastener 122 is loaded in the fastener-installation system 100, and the driver 102 drives the fastener 122 into the structure 120 upon application of pressure to the driver 102. In particular, with reference to FIGS. 1A-4, an installer operating fastener-installation system 100 may push a distal end 140 (see FIGS. 1A-B) of the fastener-installation system 100 against structure 120. As the distal end 140 is pushed against the structure 120, the piercing tip 112 pierces foam 126. Further, at the same time as applying pressure to the distal end 140, the operator may activate the trigger 142 (see FIGS. 1A-B) of the driver 102. Activating the trigger 142 causes the driver 102 to rotate a bit (e.g., a screw bit) that engages fastener 122.

As the operator continues to apply pressure to the distal end 140, the distal end 140 is compressed due to the pressure. In particular, the fastener-installation system 100 includes a telescoping portion 143 that is able to move in proximal direction 145 into body 153 as the operator applies pressure to the distal end 140. This compression forces the fastener 122 to be driven through the jaws 110A-C of the driver head 108. As fastener 122 is driven through the jaws 110A-C, the jaws 110A-C move from the closed position 111 to the expanded position 113. This movement from the closed position 111 to the expanded position 113 spreads apart foam 126, thereby creating a path through the foam 126 through which the fastener 122 is driven.

The operator continues to apply pressure to the distal end 140 and the trigger 142 until the fastener 122 is driven through the airplane structure 128 and is threadedly engaged with the nut 130. When the fastener is threadedly engaged with the nut 130, the panels 124A-B are secured to the airplane structure 128.

Figure 5:
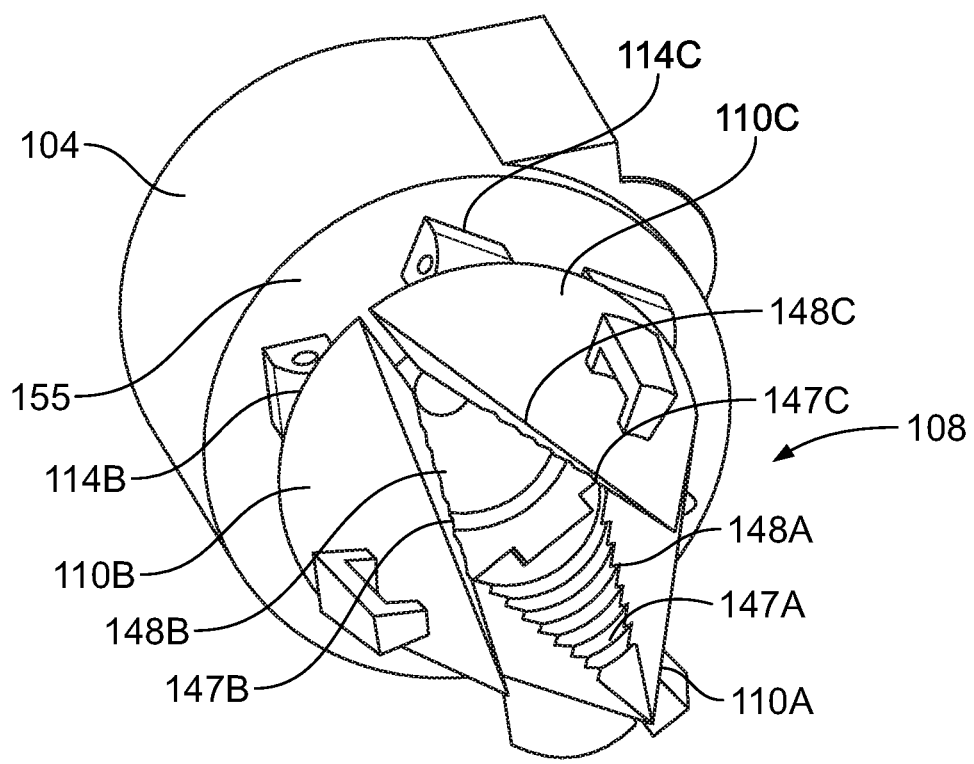
FIG. 5 illustrates a perspective view of an example fastener feeder and an example driver head of the example fastener-installation system of FIG. 1A, according to an example embodiment.

In an example embodiment, each jaw includes threads located on an inner surface of the jaw to engage with a head of the fastener. FIG. 5 illustrates a perspective view of driver head 108 and fastener feeder 104 without fastener magazine 106 attached. As seen in FIG. 5, driver head 108 includes threads 147A on inner surface 148A of jaw 110A, threads 147B on inner surface 148B of jaw 110B, and threads 147C on inner surface 148C of jaw 110C. These threads 147A-C act to self-center the fastener 122 as the fastener 122 is driven through the plurality of jaws 110A-C and hold the fastener concentric with the screw bit driving the fastener. In another example embodiment, only some of the jaws 110A-C include threads on their inner surfaces. In yet another embodiment, the jaws 110A-C do not include threads on their inner surfaces.

In an example embodiment, the driver head 108 is connected to a surface of the fastener feeder 104. For instance, as seen in FIG. 5, the driver head 108 is connected to distal surface 155. In particular, the spring loaded hinges 114A-C of jaws 110A-C are connected to the distal surface 155.

After the fastener 122 is driven into the structure 120, the operator may remove the fastener-installation system 100 from the structure 120. In an example embodiment, the fastener feeder 104 automatically loads a second fastener into the loaded position of the driver after pressure is removed from the driver. In particular, as the operator removes the fastener-installation system 100 from the structure 120 after the fastener 122 is threadedly engaged with the nut 130, the distal end 140 decompresses under a biasing force provided by internal spring 144 (see FIG. 1B). Internal spring 144 biases the distal end 140 in the distal direction 146. As the distal end 140 decompresses, the fastener feeder 104 automatically loads another fastener into a loaded position of the driver 102. Since the fastener feeder automatically loads another fastener, the operator may then immediately install another fastener.

Figure 6:
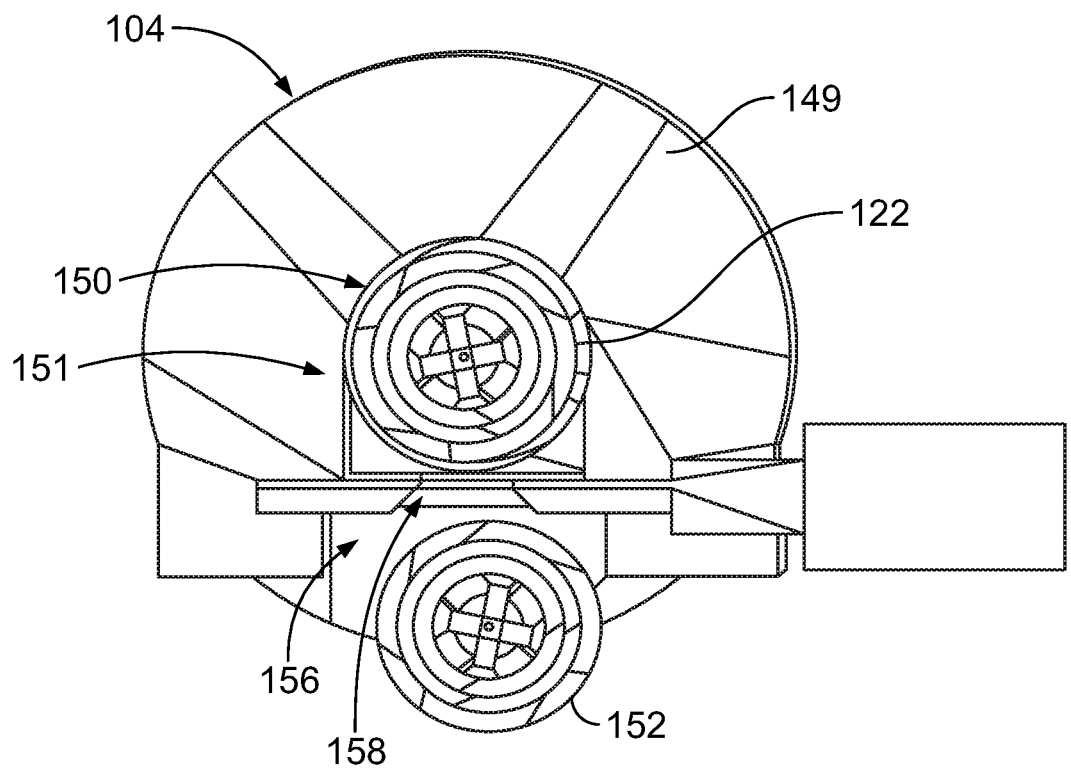
FIG. 6 illustrates a cross-sectional view of an example fastener feeder of the example fastener-installation system of FIG. 1A, according to an example embodiment.

FIG. 6 depicts a cross-section of fastener feeder 104. As seen in FIG. 6, fastener feeder 104 includes a housing 149 that includes a chamber 151 into which the fastener is loaded. Fastener 122 is depicted in a loaded position 150 in chamber 151. After fastener 122 is driven into the structure 120 and the pressure is removed from the driver 102, the fastener feeder 104 may force fastener 152 into the loaded position 150. The fastener feeder 104 includes a track 156 to guide the fastener 152 to the loaded position 150 in chamber 151.

In an example embodiment, the track 156 includes an opening 158 that exits into the loaded position 150 of chamber 151. This opening 158 may be blocked during the installation of fastener 122 (e.g., when telescoping portion 143 is moved in proximal direction 145 (see FIGS. 1A-B)). However, when pressure is removed from the driver and distal end 140 decompresses as spring 144 (see FIG. 1B) biases the distal end 140 in the distal direction 146, this opening 158 may be unblocked, so as to allow fastener 152 to be loaded into the loaded position 150. Any suitable force to load the fastener 152 into the loaded position 150 may be used. In an example, the fastener feeder 104 loads the fastener 152 into the loaded position 150 via a biasing force provided by the fastener magazine 106, such as a spring force.

The fastener feeder 104 may be made from any suitable material. In an example, the fastener feeder 104 is comprised substantially of plastic. For instance, the fastener feeder 104, housing 149, chamber 151, and track 156 may be formed substantially of plastic. Plastic may help to keep the overall weight of the fastener-installation system 100 low. Other materials are of course possible as well.

As mentioned above, the fastener magazine 106 is configured to hold a plurality of fasteners. In an example embodiment, fastener magazine 106 includes an inner body having a spiral track configured to hold at least two rows of fasteners. Further, the fastener magazine includes a disc rotatable with respect to the spiral track and having a plurality of cutouts, wherein each cutout spans each row of the at least two rows of fasteners, and wherein rotation of the disc with respect to the spiral track moves the plurality of fasteners through the spiral track.

Figure 7A:
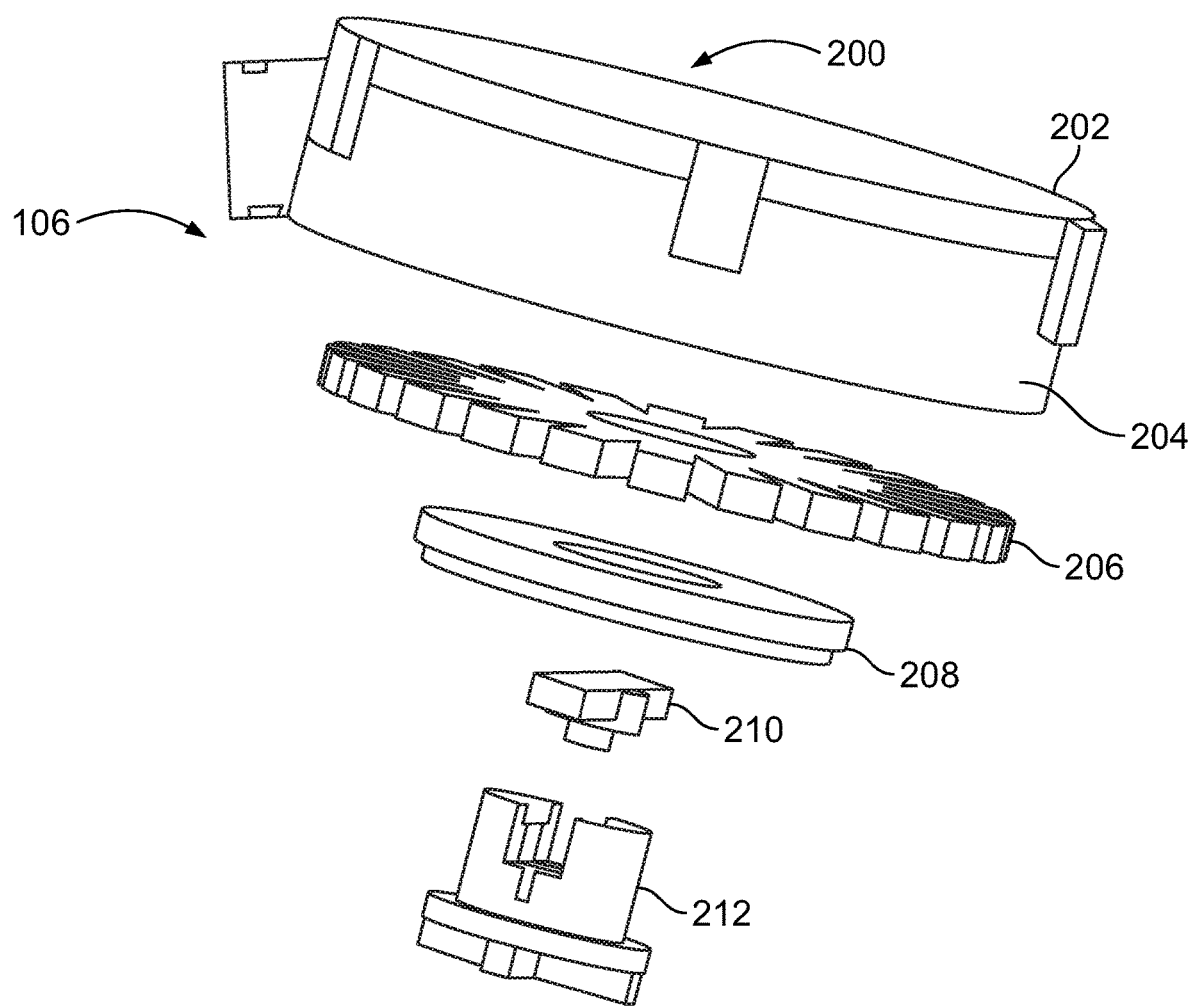
FIGS. 7A-B illustrate a perspective view and a cross-sectional view of an example fastener magazine of the example fastener-installation system of FIG. 1A, according to an example embodiment.
Figure 7B:
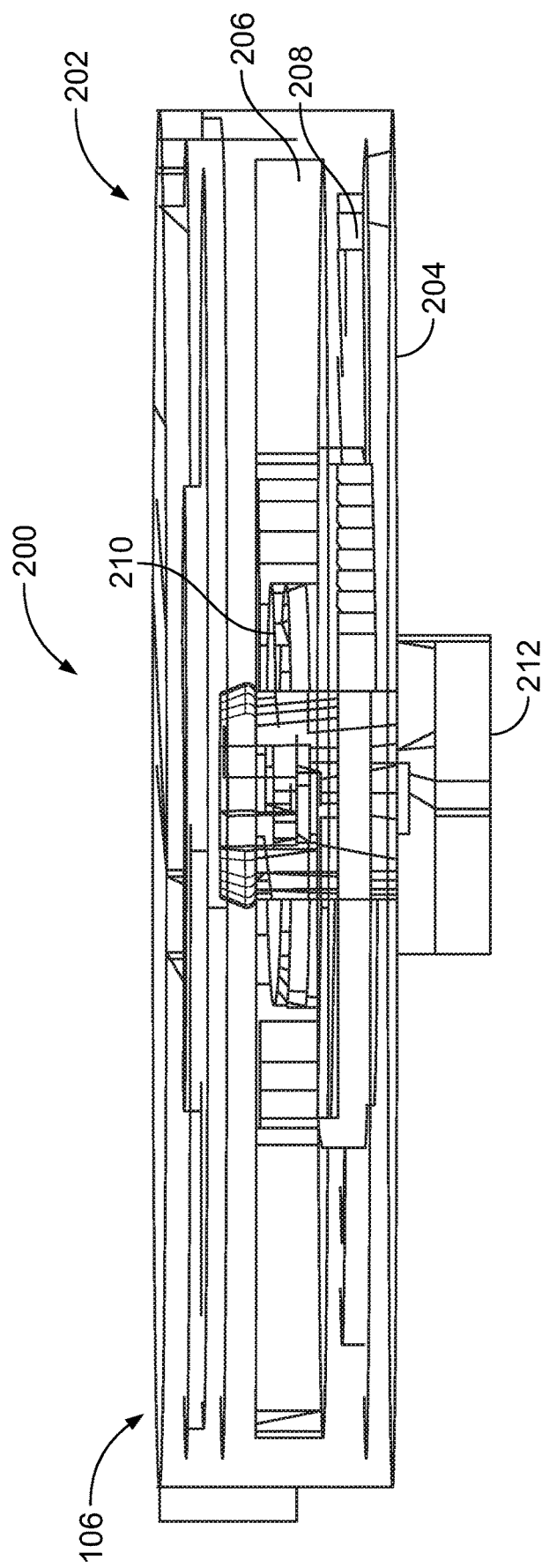
Figure 8A:
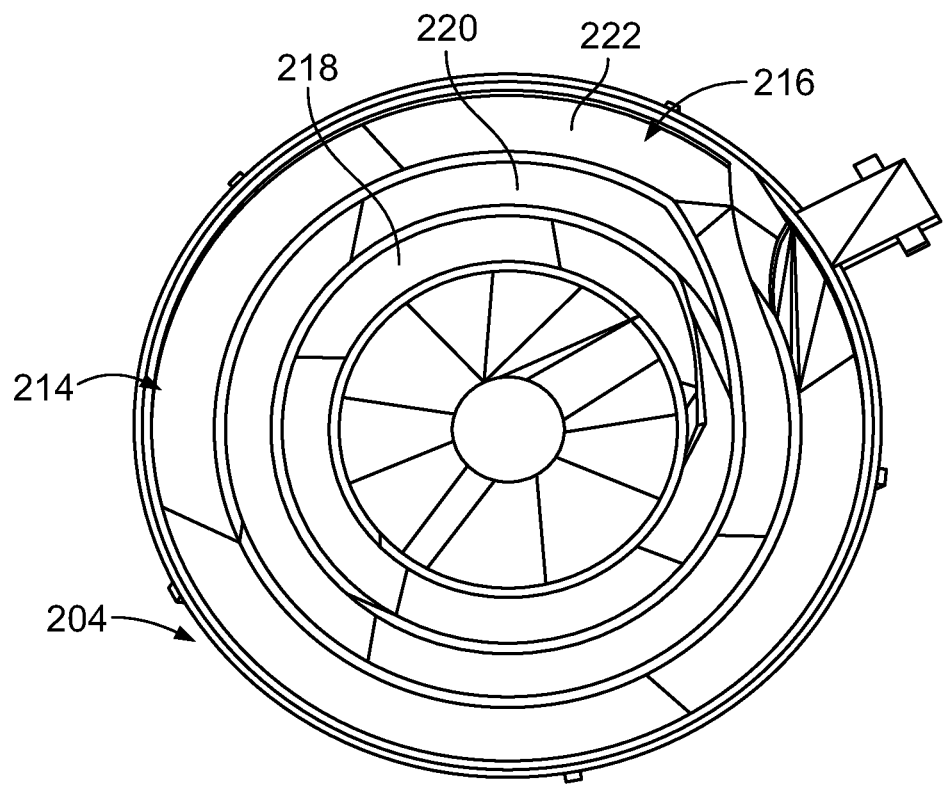
FIGS. 8A-B illustrate a top view and a perspective view of an example main body of the example fastener magazine of FIGS. 7A-B, according to an example embodiment.
Figure 8B:
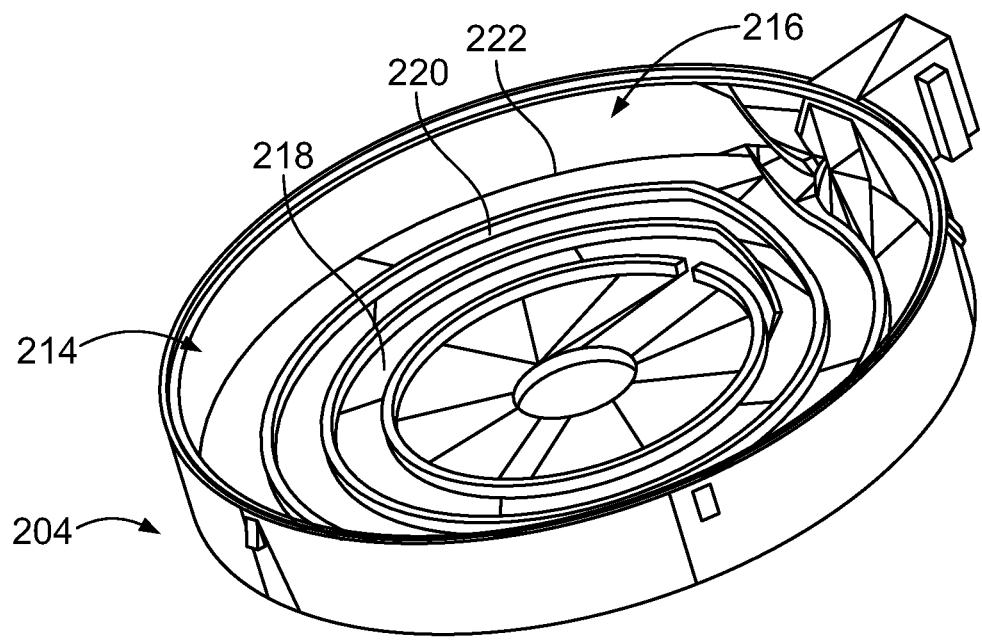

Fastener magazine 106 is described in greater detail with reference to FIGS. 7A-10. As shown in FIGS. 7A-B, fastener magazine includes a housing 200 including a lid 202 and main body 204, a disc 206, a spring housing 208 that houses a spring, a key 210, and a central rod 212. As shown in FIGS. 8A-B, the main body 204 includes an inner body 214 having a spiral track 216 configured to hold multiple rows of fasteners. Spiral track 216 includes a first row 218, a second row 220, and a third row 222. This disclosed spiral arrangement allows the fastener magazine 106 to hold a large number of screws in a compact and lightweight fashion. Although FIGS. 8A-B depict three rows of fasteners, more or fewer rows are possible. For instance, in an example, the spiral track 216 includes four or more rows. In another example, the spiral track 216 includes two rows.

The fastener magazine 106 may be made from any suitable material. In an example, the fastener magazine 106 is comprised substantially of plastic. Plastic may help to keep the overall weight of the fastener-installation system low. Other materials are of course possible as well.

Figure 9:
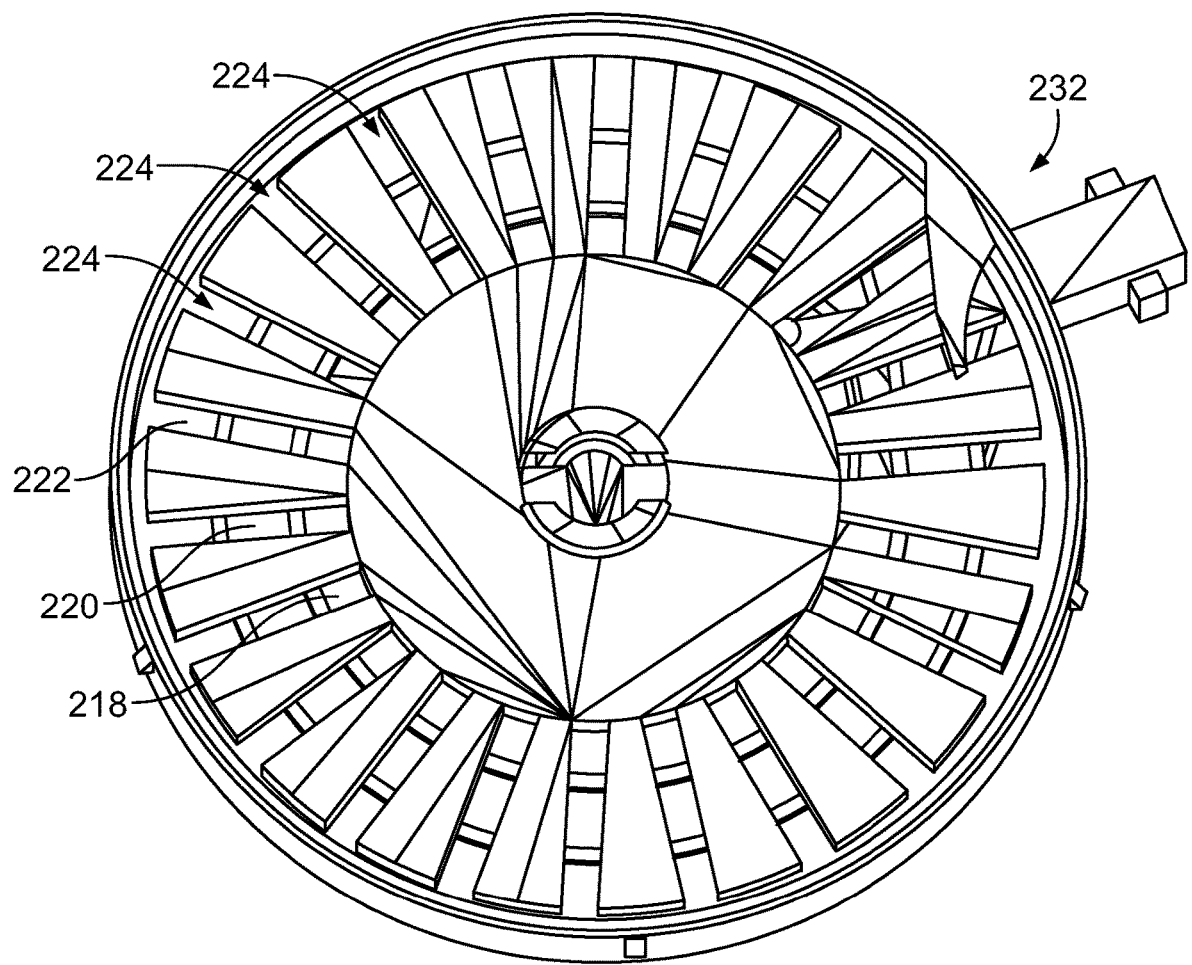
FIG. 9 illustrates a top view of example components of the example fastener magazine of FIGS. 7A-B, according to an example embodiment.
Figure 10:
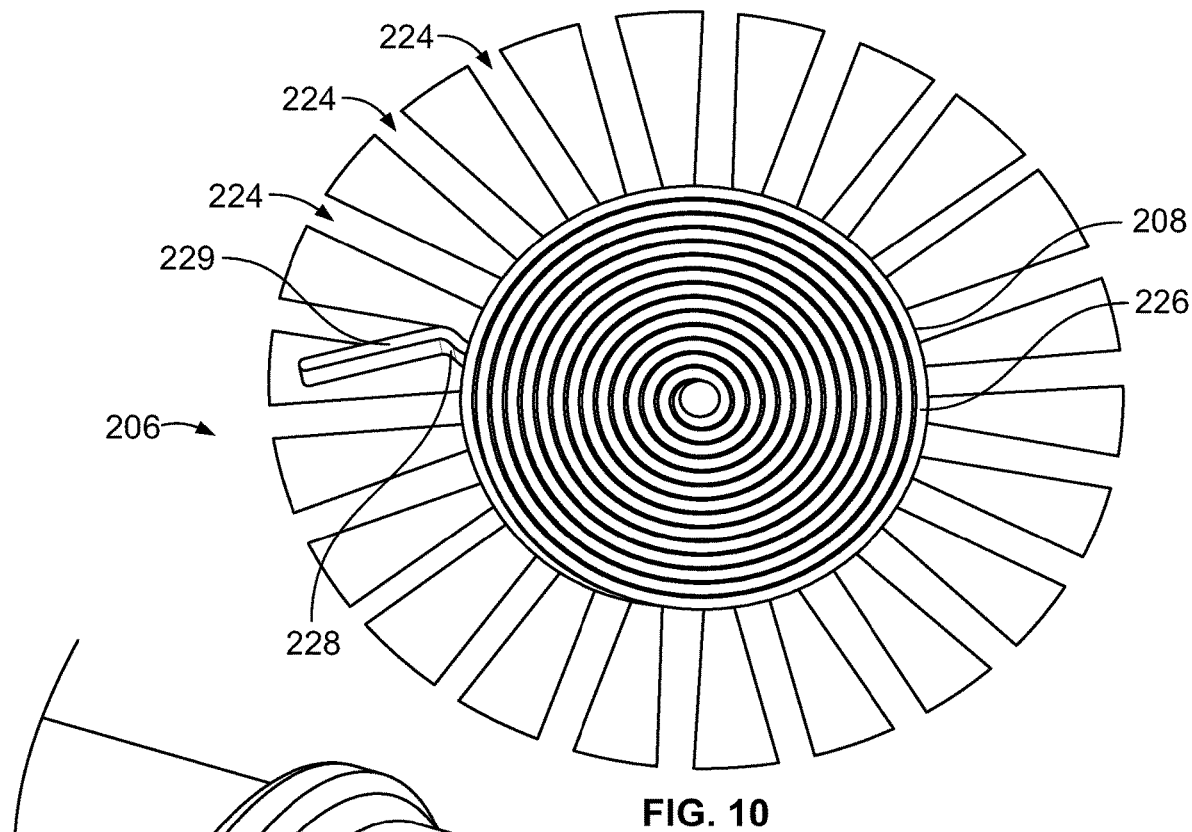
FIG. 10 illustrates a bottom view of example components of the example fastener magazine of FIGS. 7A-B, according to an example embodiment.

Disc 206, spring housing 208, key 210, and central rod 212 are arranged in the housing 200 (see FIG. 7B). The disc 206 is rotatable with respect to the spiral track 216 and includes a plurality of cutouts 224 (see FIG. 9). For simplicity, FIG. 9 specifically points to three cutouts 224; however, it is clear that disc 206 includes numerous other cutouts. As seen in FIG. 9, each cutout 224 spans each row of the multiple rows of fasteners. In particular, each cutout 224 spans rows 218, 220, and 222. The fasteners are positioned through the cutouts and rotation of the disc 206 with respect to the spiral track 216 moves the plurality of fasteners through the spiral track 216. The disc 206 may be configured to rotate in any suitable way in order to advance the fasteners through the spiral track 216. In an example, a spring is coupled to the disc 206 in order to provide a biasing force to rotate the disc 206. For example, with reference to FIG. 10, spiral torsion spring 226 housed in spring housing 208 and torsion spring 226 provides a biasing force to rotate the disc 206. An end 228 of the torsion spring 226 is connected to a rod 229 that is in turn connected to the disc 206. The spring may thus bias the disc 206 to provide rotation.

In operation, after the fastener 122 is installed, the spring 226 rotates the disc 206 to move the screws along the spiral track 216. As the disc 206 rotates and moves the fasteners through the spiral track 216, the rotation forces fastener 152 through the track 156 and opening 158 and into the loaded position 150 (see FIG. 6).

Fastener magazine 106 may hold any suitable type of screw. For instance, in an example embodiment, the fastener magazine 106 holds machine screws, wood screws, sheet metal screws, and/or socket screws. Although fastener magazine 106 is described with respect to screws, in other examples, fastener magazine 106 is configured to hold other fasteners, such as bolts, rivets, nuts, and nails. Other fasteners are possible as well.

Further, different fasteners may have different shapes and sizes. It should be understood that the components of the fastener magazine 106 may be varied to accommodate these different shapes and sizes of various fasteners. In an example, the depth of the main body 204 is greater for longer fasteners than for shorter fasteners. In another example, the cutouts 224 of disc 204 are larger for thicker fasteners than thinner fasteners. In another example, the number of rows of the spiral track 216 is greater for thinner fasteners than for thicker fasteners.

Figure 11:
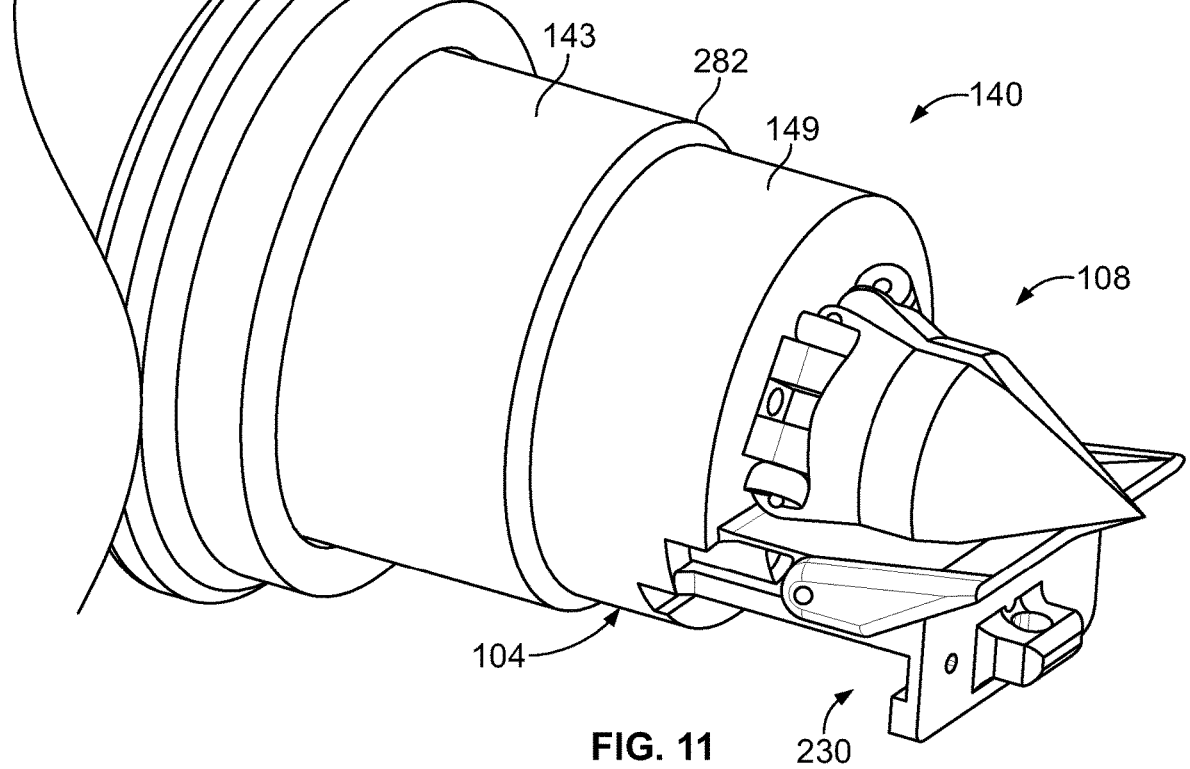
FIG. 11 illustrates a perspective view of a distal end of the example fastener-installation system of FIG. 1A, according to an example embodiment.

In an example embodiment, the fastener magazine 106 is removable from system 100. This allows the operator to replace an empty fastener magazine with a new fastener magazine. FIG. 11 illustrates a view of the distal end 140 of fastener-installation system 100 where fastener magazine 106 is removed from the system 100. The fastener feeder 104 includes a connector 230 that can engage with a corresponding connector of a magazine, such as corresponding connector 232 of magazine 106 (see FIG. 9). Connector 230 and corresponding connector 232 are illustrated as snap-fit connectors. However, any suitable connector may be used. In an example embodiment, connectors 230 and 232 are threads, snap locks, snap fits, luer locks, bayonet, snap rings, or keyed slots. Other connectors are possible as well.

Although in the example embodiment depicted in FIGS. 1-11 the fastener magazine is a magazine with a spiral track that holds multiple rows of fasteners, other fastener-magazine designs are possible as well. For instance, in another example embodiment, the system 100 includes a straight-clip magazine. FIGS. 12A-B illustrates an example straight-clip magazine 250. The straight-clip magazine 250 includes a spring 252 to bias the fasteners into the loaded position 150. In the example shown, straight-clip magazine 250 is configured to hold approximately 15 fasteners, while fastener magazine 106 is configured to hold approximately 50-75 fasteners. A straight-clip magazine such as straight-clip magazine 250 may be useful for fitting the system 100 into smaller spaces, such as tight corner spaces, during the installation process. Other fastener magazines are possible as well.

In an example embodiment, the fastener magazine may be arranged at different angles with respect to the fastener-installation system 100 when the fastener magazine is connected to fastener-installation system 100. For instance, with reference to FIG. 1B, the fastener magazine 106 is substantially perpendicular to the longitudinal axis 253 of the system 100. However, in other example embodiments, the fastener magazine may be arranged at different angles with respect to the longitudinal axis 253 of the system 100. For instance, with reference to FIGS. 11 and 12A-B, the connector 254 of magazine 250 is angled such that when the magazine 250 is connected to the corresponding connector 230 of fastener feeder 104, the magazine 250 will be arranged at approximately a 60 degree angle with respect to the longitudinal axis 253. In an example, the magazine 250 is arranged at an angle between 25-90 degrees with respect to the longitudinal axis 253. In another example, the magazine 250 is arranged at an angle between 25-60 degrees with respect to the longitudinal axis 253. Other angles are possible as well. Arranging the fastener magazine at different angles may be useful for fitting the system 100 into tight spaces during the installation process. For instance, an angle between 25-60 degrees helps to allow the use of the fastener-installation system 100 within the interior of a cargo bay where installers are working inside a cylinder (i.e., the fuselage) and a 90 degree orientation of the fastener magazine 250 would limit the ability to drive fasteners in the lower half of the cylinder (i.e., the belly of the aircraft).

Figure 13:
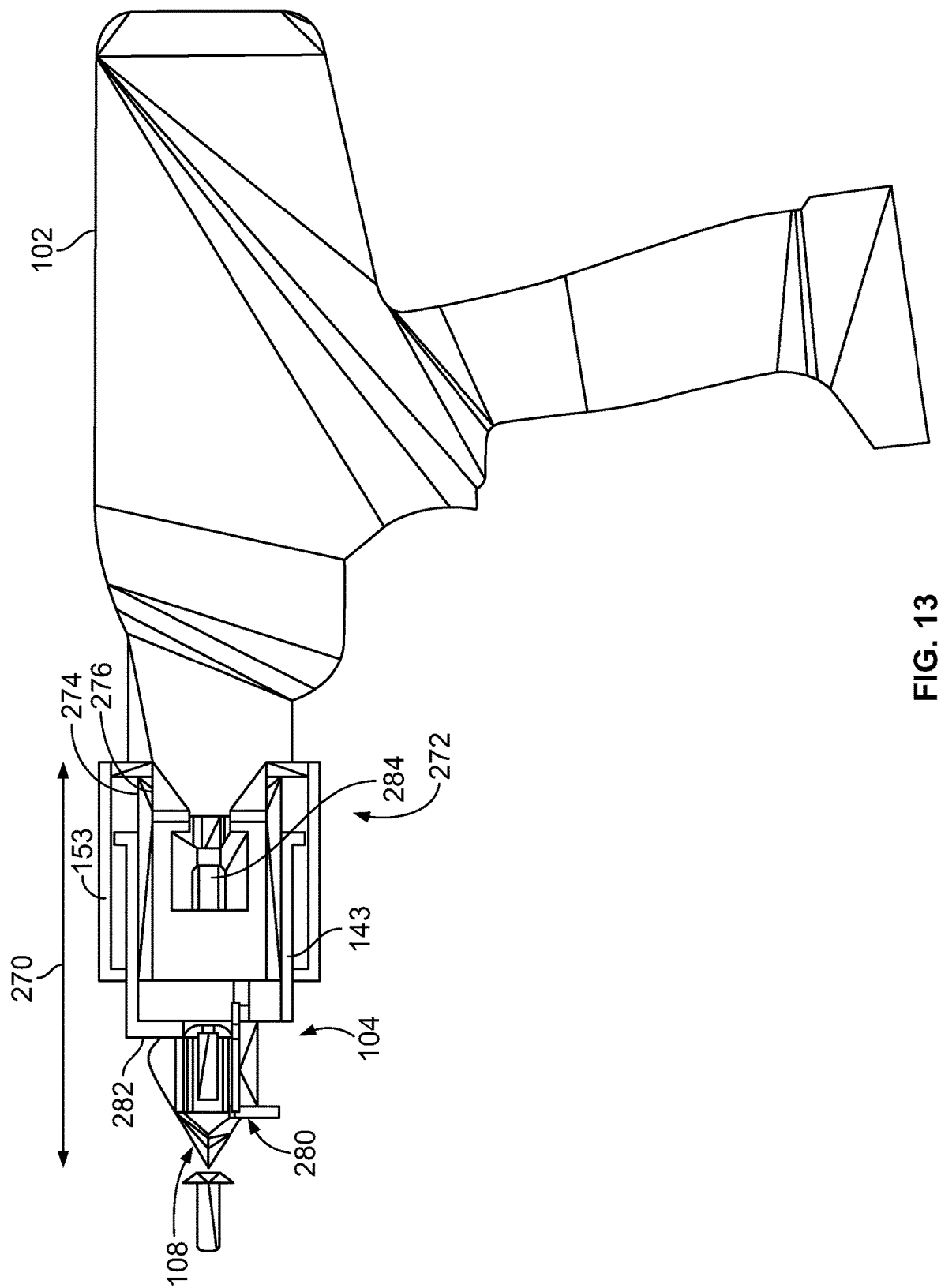
FIG. 13 illustrates a cross-sectional view of the example fastener-installation system of FIG. 1A, according to an example embodiment.

In an example embodiment, the fastener feeder 104 and driver head 108 are part of an attachment that removably attaches to driver 102. With reference to FIG. 13, the fastener feeder 104 and driver head 108 are part of attachment 270. The attachment 270 includes a main body 272. Main body 272 includes telescoping portion 143, body 153, and fastener feeder 104. In an embodiment, telescoping portion 143 and body 153 are substantially circular; however, other shapes are possible as well. The fastener feeder 104 is configured to load a fastener into the loaded position for being driven by driver 102. Further, the driver head 108 is located at a distal end 280 of the main body 272. For instance, in the example of FIG. 13, the distal end 280 of the main body 272 is the distal end of the fastener feeder 104, and driver head 108 is connected to a distal surface of the fastener feeder 104.

The main body 272 has a connector 274 to attach to corresponding connector 276 of the driver 102. In an example embodiment, the driver 102 is a screw gun and the corresponding connector 276 includes external threads on the front of the screw gun. Other connectors and drivers are possible as well. For instance, in other examples, the driver is a rivet gun, a nail gun, an impact wrench, or another impact driver. Further, in other examples, the connectors 274 and 276 are threads, snap locks, snap fits, luer locks, bayonet, snap rings, or keyed slots.

In an example, as seen with reference to FIGS. 11 and 13, fastener feeder 104 is attached to a distal end 282 of the telescoping portion 143. The distal end 282 of the telescoping portion includes a hole through which a drill bit 284 (see FIG. 13) can move. In an example, the housing 149 (see FIG. 6) of fastener feeder 104 abuts the distal end 282 of the telescoping portion 143, and loaded position 150 of chamber 151 (see FIG. 6) aligns with the hole of the distal end of telescoping portion 143 through which drill bit 284 can move. In another example embodiment, the fastener feeder 104 includes the telescoping portion 143, and the chamber 151 that holds the fastener in the loaded position 150 is located in the telescoping portion 143. Further, in such an example, at least some portion of track 156 that leads to the loaded position 150 of chamber 151 may be located in the telescoping portion 143.

Although the example of FIG. 13 illustrates that the fastener feeder 104 and driver head 108 are part of an attachment 270 that can be removably attached to the driver, in another example embodiment of system 100, the fastener feeder 104 and driver head 108 are permanently connected to the driver 102.

Figure 14:
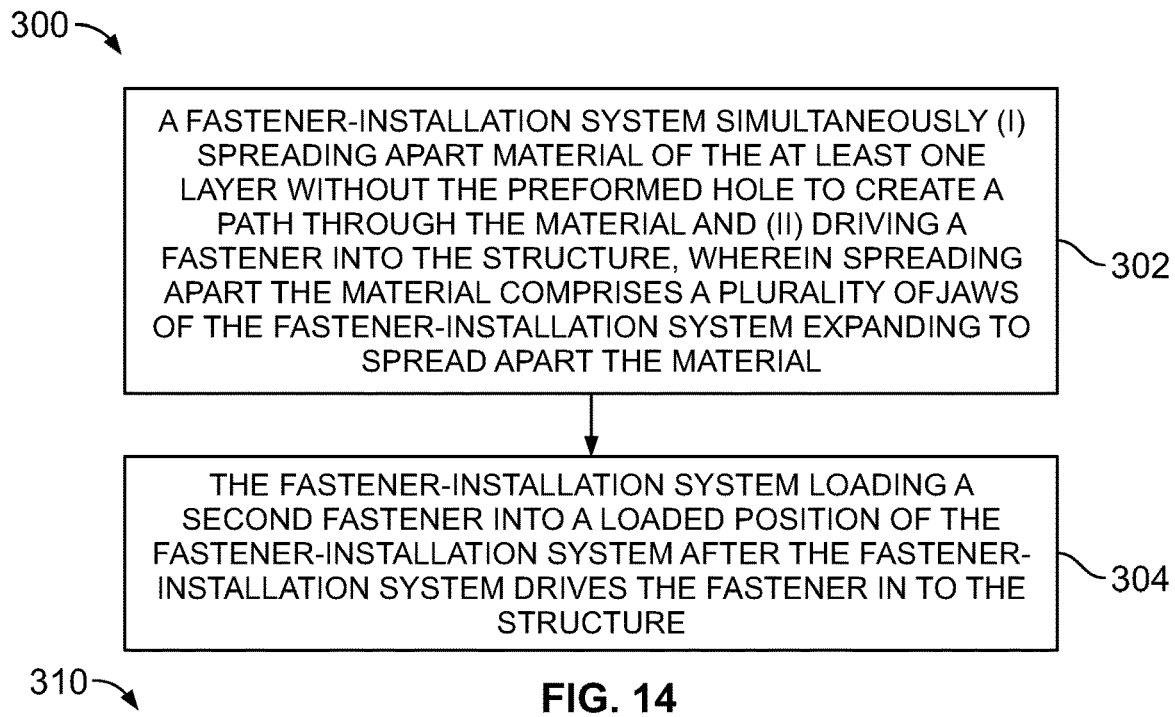
FIG. 14 shows a flowchart of an example method for driving a fastener into a structure, according to an example embodiment.

FIG. 14 shows a flowchart of an example method 300 for driving a fastener into a structure, where the structure includes at least one layer having a preformed hole and at least one layer without a preformed hole, according to an example embodiment. Method 300 shown in FIG. 14 presents an embodiment of a method that, for example, could be carried out by the fastener-installation system 100 described with reference to FIGS. 1-12, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art. For example, although in this example the structure includes at least one layer having a preformed hole and at least one layer without a preformed hole, in another example embodiment, the structure includes only layers without any preformed holes.

At block 302, the method 300 includes fastener-installation system 100 simultaneously (i) spreading apart material of the at least one layer without the preformed hole to create a path through the material and (ii) driving fastener 122 into the structure 120, wherein spreading apart the material comprises the plurality of jaws 110A-C of the fastener-installation system 100 expanding to spread apart the material. At block 304, the method includes the fastener-installation system 100 loading a second fastener 152 into a loaded position 150 of the fastener-installation system 100 after the fastener-installation system 100 drives the fastener 122 into the structure 120.

In an example embodiment of method 300, the at least one layer having a preformed hole comprises the panels 124A-B and airplane structure 128 having attached nut 130, and the at least one layer without a preformed hole comprises foam 126 located between the panels 124A-B and the airplane structure 128. In this example, the method involves (i) the fastener-installation system 100 spreading apart the foam 126 to create a path through the foam 126 and (ii) the fastener-installation system 100 driving the fastener 122 into the panels 124A-B, the foam 126, the airplane structure 128, and the nut 130 to secure the panels 124A-B to the airplane structure 128.

In another example embodiment of method 300, the plurality of jaws 110A-C of the fastener-installation system 100 expanding to spread apart the material involves jaws 110A-C expanding from closed position 111 to expanded position 113 as the fastener 122 is moved through the jaws 110A-C.

In an example embodiment of method 300, the fastener-installation system 100 simultaneously spreads apart the material and drives the fastener 122 into the structure 120 as pressure is applied to the fastener-installation system 100. Further, the fastener-installation system 100 loads the second fastener 152 into the loaded position 150 when the pressure is removed from the fastener-installation system 100.

Figure 15:
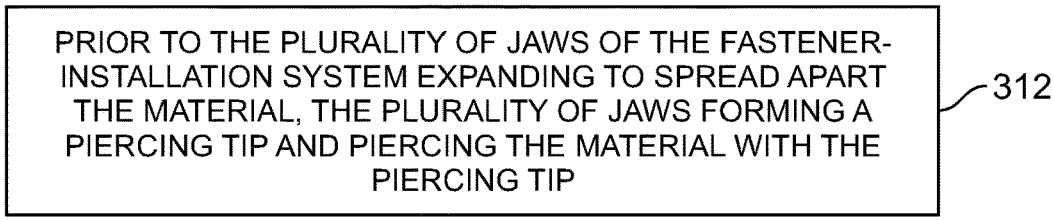
FIG. 15 shows a flowchart of an example method for use with the method in FIG. 14, according to an example embodiment.

FIG. 15 shows a flowchart of an example method 310 for use with the method 300, according to an example embodiment. In particular, at block 312, the method includes, prior to the plurality of jaws 110A-C of the fastener-installation system 100 expanding to spread apart the material, the plurality of jaws 110A-C forming a piercing tip 112 and piercing the material with the piercing tip 112.

Figure 16:
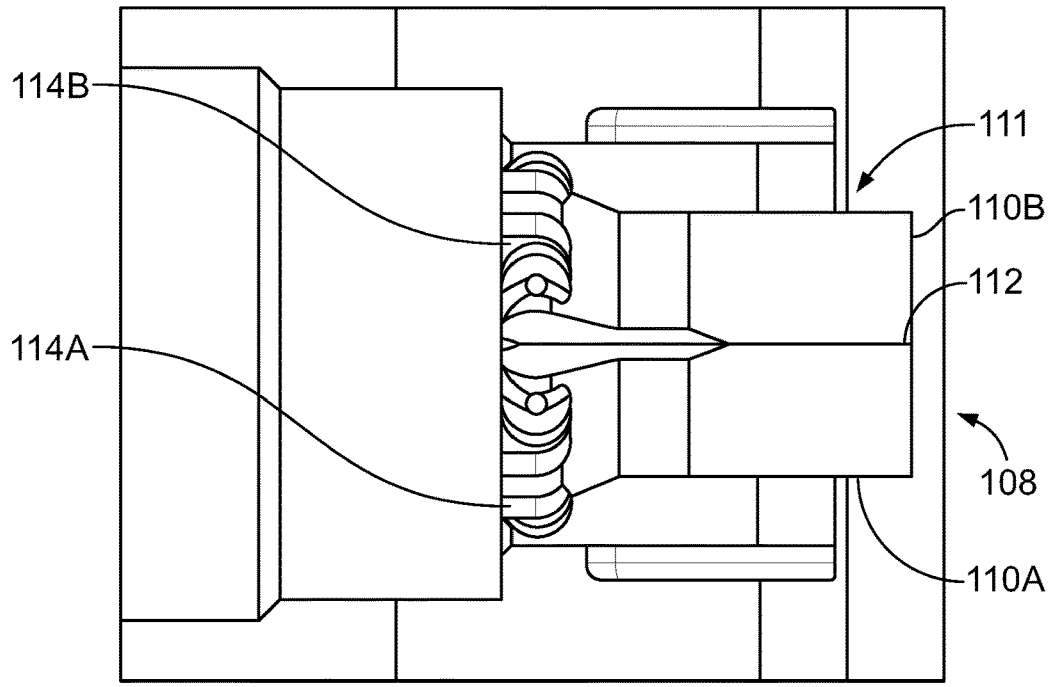
FIG. 16 illustrates a top view of an example driver head of the example fastener-installation system of FIG. 1A in a closed position, according to an example embodiment.

As mentioned above, in the closed position 111, the plurality of jaws 110A-C form a piercing tip 112 to pierce material of the structure into which the fastener is inserted. In another example embodiment, the jaws 110A-C form a substantially flat tip rather than a piercing tip. For instance, FIG. 16 illustrates an embodiment of driver head 108 where the plurality of jaws 110A-C form a substantially flat tip 112A in the closed position 111. In an example, the substantially flat tip 112A is used for a structure in which the material (e.g., foam 126) is the topmost layer.

In an example embodiment, the substantially flat tip 112A compresses the foam 126 and the fastener 122 pierces foam 126 as the fastener 122 is driven through the foam 126. In such an embodiment, the jaws 110A-C act to compress the foam 126 when the jaws 110A-C are forced against the foam 126. This compression reduces the thickness of the foam 126, and this reduced thickness helps to prevent the foam 126 from winding around the fastener 122 (e.g., around the threads of the fastener) while the fastener pierces the foam 126.

In another example embodiment, rather than the fastener 122 piercing the foam 126, the substantially flat tip 112A creates the entire path in the foam 126 through which the fastener is to be driven. For instance, a user could create a pilot hole or another cut (e.g., one or more radial slits) in the foam 126. The user could then apply pressure to the foam 126 with the substantially flat tip 112A, and, as the jaws 110A-C move to the open position, the jaws would create the hole through which the fastener is driven. In an example embodiment, the hinges 114A-C are spring-loaded radially outward, so that the jaws 110A-C slide radially outward when the jaws 110A-C move from the closed position to the open position.

Example fastener-installation systems and methods described herein provide improved systems and methods for installing cargo-liner panels. The disclosed systems and methods beneficially reduced the number of steps and tools used to clear the foam, insert the fastener, and tighten the fastener to secure the cargo-liner panel to the airplane structure. As mentioned above, in prior installation systems and methods, the operator would clear the foam with a first tool, hand insert the fastener, and then thread the fastener with a screw gun. The disclosed systems and methods beneficially allow the operator to clear the foam, insert the fastener, and tighten the fastener to secure the panel to the airplane structure in a single step with a single tool. This not only reduces the overall time of the cargo-liner panel installation process but also reduces ergonomic stresses on the operator during the cargo-liner panel installation process.

Further, in prior installation methods, the operator would also hand insert the fasteners into the structure prior to driving the fastener with a screw gun. The disclosed systems and methods beneficially automatically load fasteners into the driver from a lightweight and compact fastener magazine that can hold a large number of fasteners. Automatically loading the fasteners from the lightweight and compact fastener magazine not only reduces the overall time of the cargo-liner panel installation process but also reduces ergonomic stresses on the operator during the cargo-liner panel installation process. Further, the disclosed fastener magazines also help to reduce or prevent foreign object debris (FOD) during the cargo-liner panel installation process.

Although the disclosed fastener-installation systems and methods are described with reference to installation of cargo-liner panels, it should be understood that disclosed systems and methods may be implemented in other systems as well. For instance, the disclosed systems and methods may be implemented in other areas of an aircraft. Further, disclosed systems and methods may be implemented to drive fasteners into structures used in other industries, such as the automotive industry, the construction industry, or the agricultural industry. Other examples are possible as well.

Additionally, although the disclosed fastener-installation systems and methods are described primarily with reference to screws, it should be understood that the disclosed fastener-installation systems and methods may use other fasteners as well. For instance, in other examples, the fasteners driven by the disclosed fastener-installation systems include bolts, rivets, nuts, and nails. Other fasteners are possible as well.

Any suitable materials may be used for the fastener-installation system including but not limited to metal and plastic. In an example embodiment, the materials are selected to minimize the weight of the fastener-installation system 100, so as to reduce or limit the ergonomic stress on the operator.

By the term "substantially" it is meant that the recited characteristic need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A fastener-installation system comprising:
   a driver to drive a fastener into a structure, wherein the driver includes a body and a telescoping portion that moves in a proximal direction into the body upon application of pressure to a distal end of the driver to thereby transition the driver from a decompressed position to a compressed position, and wherein the driver includes a spring that biases the distal end of the driver in a distal direction to the decompressed position;
   a fastener feeder to load the fastener into a loaded position of the driver, wherein the fastener feeder comprises a fastener magazine to hold a plurality of fasteners; and
   a driver head coupled to the fastener feeder and comprising a plurality of jaws moveable between a closed position and an expanded position in response to the driver transitioning from the decompressed position to the compressed position, wherein in the closed position the plurality of jaws meet at a point to thereby form a piercing tip configured to pierce material of the structure, wherein a distal end of the piercing tip forms a non-zero angle with respect to the structure as the piercing tip is inserted into the material of the structure, and wherein the plurality of jaws are configured to spread apart the material of the structure when the plurality of jaws move from the closed position to the expanded position to create a path through the material through which the fastener is driven.

2. The fastener-installation system of claim 1, wherein the fastener feeder automatically loads a second fastener into the loaded position of the driver after the fastener is driven into the structure and the pressure is removed from the distal end of the driver.

3. The fastener-installation system of claim 2, wherein the fastener feeder comprises a second spring to bias the second fastener into the loaded position of the driver after the fastener is driven into the structure and the pressure is removed from the driver.

4. The fastener-installation system of claim 1, wherein the plurality of jaws move from the closed position to the expanded position as the fastener is driven through the plurality of jaws.

5. The fastener-installation system of claim 4, wherein each jaw of the plurality of jaws is spring loaded.

6. The fastener-installation system of claim 4, wherein each jaw of the plurality of jaws includes threads located on an inner surface of the jaw to engage with a head of the fastener, wherein the threads act to self-center the fastener as the fastener is driven through the plurality of jaws.

7. The fastener-installation system of claim 1, wherein the fastener magazine comprises an inner body having a spiral track configured to hold at least two rows of fasteners.

8. The fastener-installation system of claim 7, further comprising a disc rotatable with respect to the spiral track and having a plurality of cutouts, wherein each cutout spans each row of the at least two rows of fasteners, and wherein rotation of the disc with respect to the spiral track moves the plurality of fasteners through the spiral track.

9. The fastener-installation system of claim 1, wherein the driver comprises a screw gun, and wherein the driver head and fastener feeder are part of a removable attachment to be removably attached to the screw gun.

10. The fastener-installation system of claim 1, wherein the fastener magazine is arranged at an angle between 25-60 degrees with respect to a longitudinal axis of the fastener-installation system.

11. An attachment for a driver, the attachment comprising:
a main body having a connector to attach to a corresponding connector of the driver, wherein the main body includes a body and a telescoping portion that moves in a proximal direction into the body upon application of pressure to a distal end of the driver to thereby transition the main body from a decompressed position to a compressed position, and wherein the main body includes a spring that biases the distal end of the driver in a distal direction to the decompressed position;
a fastener feeder to load a fastener into a loaded position for being driven by the driver, wherein the fastener feeder comprises a fastener magazine to hold a plurality of fasteners; and
a driver head located at a distal end of the main body and coupled to the fastener feeder, wherein the driver head comprises a plurality of jaws moveable between a closed position and an expanded position in response to the main body transitioning from the decompressed position to the compressed position, wherein in the closed position the plurality of jaws meet at a point to thereby form a piercing tip configured to pierce material of a structure, wherein a distal end of the piercing tip has a non-zero angle with respect to the structure as the piercing tip is inserted into the material of the structure, and wherein the plurality of jaws are configured to spread apart the material of the structure when the plurality of jaws move from the closed position to the expanded position to create a path through the material through which the fastener is driven.

12. The attachment of claim 11, wherein the plurality of jaws move from the closed position to the expanded position as the fastener is driven through the plurality of jaws.

13. The attachment of claim 12, wherein each jaw of the plurality of jaws is spring loaded.

14. The attachment of claim 11, wherein the fastener magazine comprises an inner body having a spiral track configured to hold at least two rows of fasteners.

15. The attachment of claim 14, further comprising a disc rotatable with respect to the spiral track and having a plurality of cutouts, wherein each cutout spans each row of the at least two rows of fasteners, and wherein rotation of the disc with respect to the spiral track moves the plurality of fasteners through the spiral track.

16. A method of driving a fastener into a structure, wherein the structure comprises at least one layer having a preformed hole and at least one layer without a preformed hole, the method comprising:
the fastener-installation system of claim 1 simultaneously (i) spreading apart material of the at least one layer without the preformed hole to create a path through the material and (ii) driving a fastener into the structure, wherein spreading apart the material comprises the plurality of jaws of the fastener-installation system expanding to spread apart the material; and
the fastener-installation system of claim 1 loading a second fastener into a loaded position of the fastener-installation system after the fastener-installation system drives the fastener into the structure.

17. The method of claim 16, wherein the plurality of jaws of the fastener-installation system expanding to spread apart the material comprises the plurality of jaws of the fastener-installation system expanding from a closed position to an expanded position as the fastener is moved through the plurality of jaws.

18. The method of claim 16, wherein spreading apart the material comprises:
prior to the plurality of jaws of the fastener-installation system expanding to spread apart the material, piercing the material with the piercing tip.

19. The method of claim 16, wherein the fastener-installation system simultaneously (i) spreading apart material of the at least one layer without the preformed hole to create a path through the material and (ii) driving the fastener into the structure comprises spreading apart the material and driving the fastener into the structure as pressure is applied to the fastener-installation system, and
wherein the fastener-installation system loading the second fastener into the loaded position of the fastener-installation system comprises loading the second fastener into the loaded position when the pressure is removed from the fastener-installation system.

20. The method of claim 16, wherein the at least one layer having a preformed hole comprises at least one panel and an airplane structure having an attached nut, wherein the at least one layer without a preformed hole comprises foam located between the at least one panel and the airplane structure having the attached nut, and wherein the fastener-installation system simultaneously (i) spreading apart material of the at least one layer without a preformed hole to create a path through the material and (ii) driving the fastener into the structure comprises:
the fastener-installation system spreading apart the foam to create a path through the foam; and
the fastener-installation system driving the fastener into the at least one panel, the foam, the airplane structure, and the nut to secure the at least one panel to the airplane structure.

* * * * *